United States Patent
Oaki

(10) Patent No.: US 10,434,647 B2
(45) Date of Patent: Oct. 8, 2019

(54) ROBOT CONTROL DEVICE, A ROBOT CONTROL METHOD, AND A PICKING DEVICE

(71) Applicant: Kabushiki Kaisha Toshiba, Minato-ku (JP)

(72) Inventor: Junji Oaki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 195 days.

(21) Appl. No.: 15/687,902

(22) Filed: Aug. 28, 2017

(65) Prior Publication Data

US 2018/0147724 A1  May 31, 2018

(30) Foreign Application Priority Data

Nov. 25, 2016 (JP) .................. 2016-229327

(51) Int. Cl.
B25J 9/16 (2006.01)

(52) U.S. Cl.
CPC ........... *B25J 9/1633* (2013.01); *B25J 9/1638* (2013.01); *B25J 9/1676* (2013.01); *G05B 2219/39353* (2013.01); *G05B 2219/39355* (2013.01); *G05B 2219/41374* (2013.01); *G05B 2219/41387* (2013.01)

(58) Field of Classification Search
CPC ...... B25J 9/1633; B25J 9/1676; B25J 9/1638; G05B 2219/41387; G05B 2219/41374; G05B 2219/39355; G05B 2219/39353
USPC .................................................. 700/245, 253
See application file for complete search history.

(56) References Cited

U.S. PATENT DOCUMENTS

| | | | |
|---|---|---|---|
| 7,558,647 B2 | 7/2009 | Okazaki | |
| 7,765,023 B2 * | 7/2010 | Oaki | B25J 9/1692 700/157 |
| 8,155,790 B2 | 4/2012 | Oga et al. | |
| 8,694,159 B2 | 4/2014 | Oaki et al. | |
| 9,007,487 B2 * | 4/2015 | Yoshioka | H04N 5/2353 348/229.1 |
| 9,089,971 B2 * | 7/2015 | Aoba | B25J 9/1697 |
| 9,156,166 B2 | 10/2015 | Oaki | |
| 9,179,047 B2 * | 11/2015 | Dani | G01B 11/24 |
| 9,242,374 B2 | 1/2016 | Oaki | |

(Continued)

FOREIGN PATENT DOCUMENTS

| | | |
|---|---|---|
| JP | 2001-92511 | 4/2001 |
| JP | 3878054 | 2/2007 |

(Continued)

*Primary Examiner* — Jaime Figueroa
(74) *Attorney, Agent, or Firm* — Oblon, McClelland, Maier & Neustadt, L.L.P.

(57) ABSTRACT

According to one embodiment, a robot control device is used for a robot arm including a link and a motor for rotationally driving the link. The robot control device includes a derivation part. The derivation part derives a first estimated value including a variation of a rotation angle of the link and a second estimated value including a variation of a rotation angle of the motor, based on an angular velocity and a current reference value of the motor. Furthermore, the derivation part derives an external force generated to the robot arm, based on a difference between the first estimated value and the second estimated value.

11 Claims, 7 Drawing Sheets

(56) References Cited

U.S. PATENT DOCUMENTS

| | | | |
|---|---|---|---|
| 2006/0048364 A1* | 3/2006 | Zhang | B23Q 17/0966 29/407.08 |
| 2008/0140257 A1 | 6/2008 | Sato et al. | |
| 2008/0147238 A1* | 6/2008 | Joly | G05B 19/237 700/260 |
| 2011/0060345 A1* | 3/2011 | Lee | A61B 34/30 606/130 |
| 2011/0060460 A1* | 3/2011 | Oga | B25J 9/1633 700/254 |
| 2011/0257787 A1 | 10/2011 | Sato et al. | |
| 2013/0006422 A1* | 1/2013 | Komatsu | B25J 9/1638 700/258 |
| 2013/0073085 A1* | 3/2013 | Oaki | B25J 9/1633 700/258 |
| 2014/0039678 A1* | 2/2014 | Motoyoshi | B25J 9/1694 700/258 |
| 2014/0168461 A1* | 6/2014 | Dani | G01B 11/24 348/222.1 |
| 2014/0172169 A1* | 6/2014 | Yoo | B25J 9/1633 700/261 |
| 2014/0172170 A1* | 6/2014 | Yoo | B25J 9/1633 700/261 |
| 2014/0209797 A1* | 7/2014 | Klimovitch | G01B 11/16 250/227.14 |
| 2015/0199458 A1* | 7/2015 | Bacon | G06F 17/5009 703/8 |
| 2016/0008983 A1* | 1/2016 | Osaka | B25J 9/1692 700/254 |
| 2016/0030240 A1* | 2/2016 | Gonenc | G01L 5/226 604/95.01 |
| 2016/0288325 A1* | 10/2016 | Naderer | B25J 9/1633 |
| 2018/0021094 A1* | 1/2018 | Matsuda | A61B 34/30 600/102 |
| 2018/0042464 A1* | 2/2018 | Arai | A61B 17/02 |

FOREIGN PATENT DOCUMENTS

| | | |
|---|---|---|
| JP | 4267027 | 5/2009 |
| JP | 5242342 | 7/2013 |
| JP | 2014-34101 | 2/2014 |
| JP | 5765686 | 8/2015 |
| JP | 5902425 | 4/2016 |
| JP | 6097174 | 3/2017 |
| WO | WO 2007/080733 | 7/2007 |

* cited by examiner

FIG. 7A
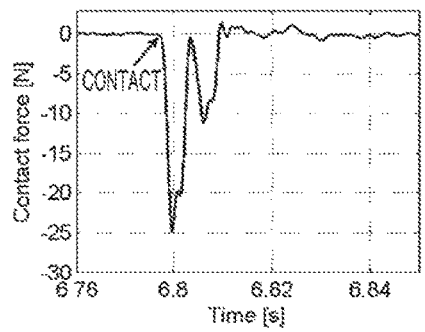
FIG. 7B
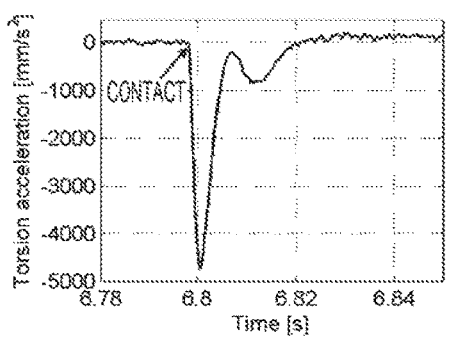
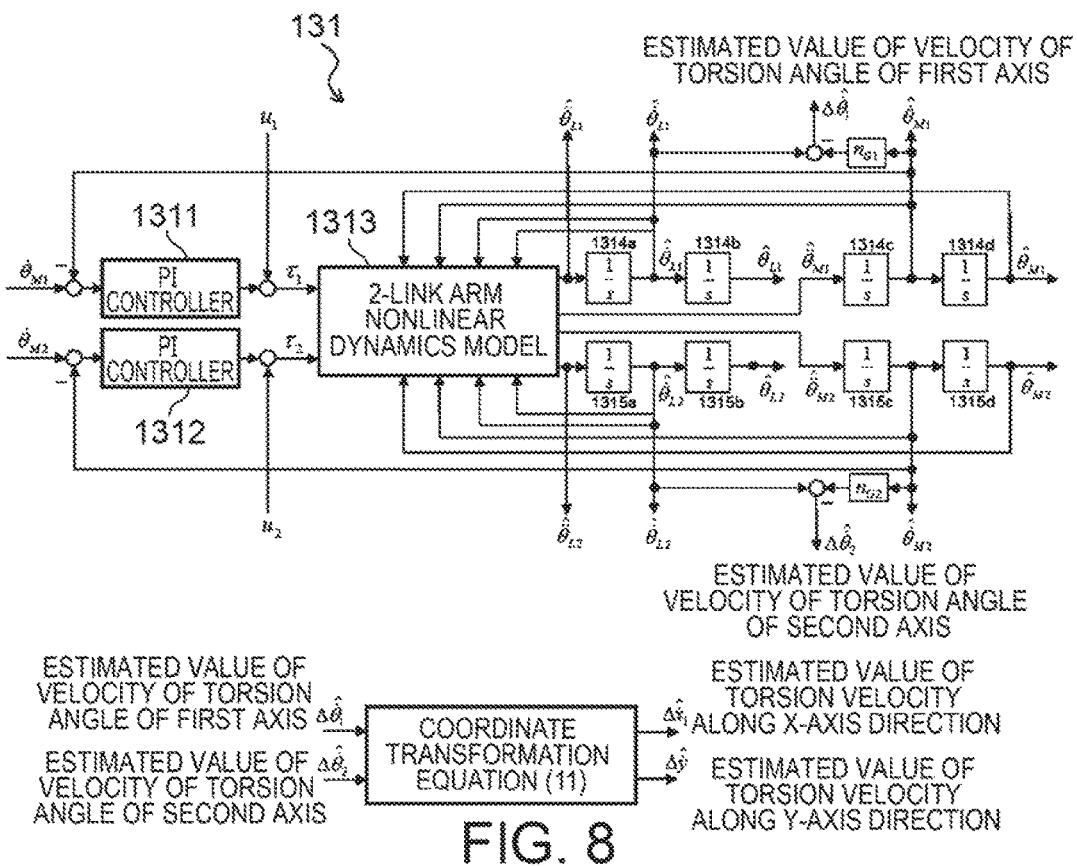
FIG. 8

ROBOT CONTROL DEVICE, A ROBOT CONTROL METHOD, AND A PICKING DEVICE

CROSS-REFERENCE TO RELATED APPLICATION

This application is based upon and claims the benefit of priority from Japanese Patent Application No. 2016-229327, filed on Nov. 25, 2016; the entire contents of which are incorporated herein by reference.

FIELD

Embodiments described herein relate generally to a robot control device, a robot control method, and a picking device.

BACKGROUND

In an automation line using a robot arm, a worker performs working called "teaching" to previously store position data of a tip of the arm. Teaching needs time and labor, and the worker's burden is large. Accordingly, teaching-less is required for the worker. In order to perform teaching-less, a visual sensor and a force sensor are simultaneously used for the robot. However, the visual sensor has error in a depth direction, and the visual sensor having high accuracy requires high cost. Furthermore, in the case of using the force sensor installed to a tip of the robot arm, the depth direction can be measured from contact information acquired by touching operation (the tip is lightly touched with a working object). However, the force sensor is expensive, and easy to be broken. Instead of the force sensor, even if a mechanism to detect the contact power is attached, this becomes a factor of high cost.

Accordingly, without additional sensors and so on, based on encoder values of a motor driving each joint of the robot arm, estimation of an external force occurred at the tip of the arm is requested.

BRIEF DESCRIPTION OF THE DRAWINGS

FIGS. 7A and 7B are graphs showing estimated values of torsion acceleration of the tip of arm estimated by the robot control device according to the first embodiment.

FIG. 8 is a block diagram of the observer part of the robot control device according to the second embodiment.

DETAILED DESCRIPTION

Figure 1:
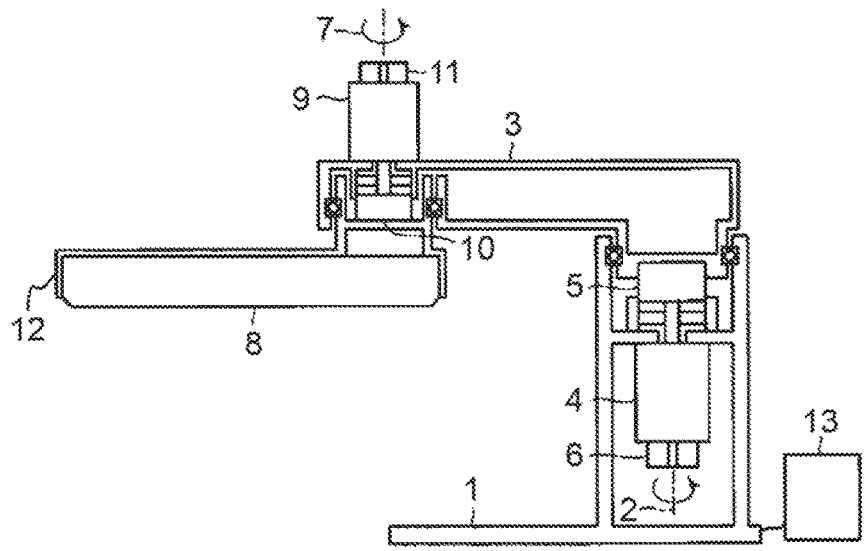
FIG. 1 is one example of a sectional view of two-link robot arm as a control target for a robot control device according to the first embodiment.

According to one embodiment, a robot control device is used for a robot arm including a link and a motor for rotationally driving the link. The robot control device includes a derivation part. The derivation part derives a first estimated value including a variation of a rotation angle of the link and a second estimated value including a variation of a rotation angle of the motor, based on an angular velocity and a current reference value of the motor. Furthermore, the derivation part derives an external force generated to the robot arm, based on a difference between the first estimated value and the second estimated value.

Hereinafter, a robot control device according to embodiments are described below with reference to drawings. Having the same reference numeral means the same component. Incidentally, the drawings are schematic or conceptual, a relationship between the thickness and width of each part, the dimensional ratio between parts, etc. are not necessarily the same as actual ones. Furthermore, even the same part may be depicted in the different dimensions or dimensional ratio among the drawings.

The First Embodiment

The first embodiment will be explained by referring to FIG. 1. FIG. 1 is one example of a sectional view of two-link robot arm as a control target for the robot control device according to the first embodiment.

As to this robot arm, one end of a first link 3 is installed to an upper part of a base 1. The other end of the first link 3 is installed to a second link 8.

The base 1 includes a first motor 4, a first reduction gear 5, and a first encoder 6. The first link 3 includes a second motor 9, a second reduction gear 10, and a second encoder 11. A tip of the second link 8 includes a payload 12. By the payload 12 at the tip of the second link 8, the robot arm contacts the working object (work).

In the robot control device 13, by combination of the first motor 4, the first encoder 6 and the first reduction gear 5 (having spring characteristics), the first link 3 is planarly turned around a first axis 2 as the center. Preferably, the first motor 4, the first encoder 6 and the first reduction gear 5 are coaxially positioned with the first axis 2 as the center. Furthermore, in the robot control device 13, by combination of the second motor 9, the second encoder 11 and the second reduction gear 10 (having spring characteristics), the second link 8 is planarly turned around a second axis 7 as the center (for the first link 3). Preferably, the second motor 4, the second encoder 11 and the second reduction gear 10 are coaxially positioned with the second axis 7 as the center.

The base 1 supports the first link 3 rotationally around the first axis 2. Furthermore, the base 1 is a metallic housing, and prevents the adding of external impact. The base 1 is not limited to a metal and may be a resin.

One end of the first link 3 is connected to the first reduction gear 5 in the base 1. At the other end of the first link 3, the second motor 9, the second reduction gear 10 and the second encoder 11 are located. One end of the second link 8 (rotatable around the second axis 7) is connected to the second reduction gear 10. The first link 3 and the second link 8 are arm parts of the robot.

The first reduction gear 5 and the second reduction gear 10 are located at the first motor 4 and the second motor 9 respectively, reduce a rotation velocity thereof, and determine a rotation velocity of the first link 3 and the second link 8. The reduction ratio is suitably adjusted by the number of rotation of the motor and so on.

The first encoder 6 and the second encoder 11 are located at the first motor 4 and the second motor 9 respectively, perform sensing of a rotation angle of the motor, and outputs the rotation angle to the robot control device 13. The first encoder 6 and the second encoder 11 may be a sensor or a transducer for position detection.

The payload 12 is a tip of the second link 8 to contact with the working object. The payload 12 is one part of the second link 8, and preferably has a shape easy to contact with the working object. For example, a projection may be formed on the payload 12. A position of the payload 12 is not limited to the tip of the second link 8, and may be a side face of the second link 8.

Figure 2:
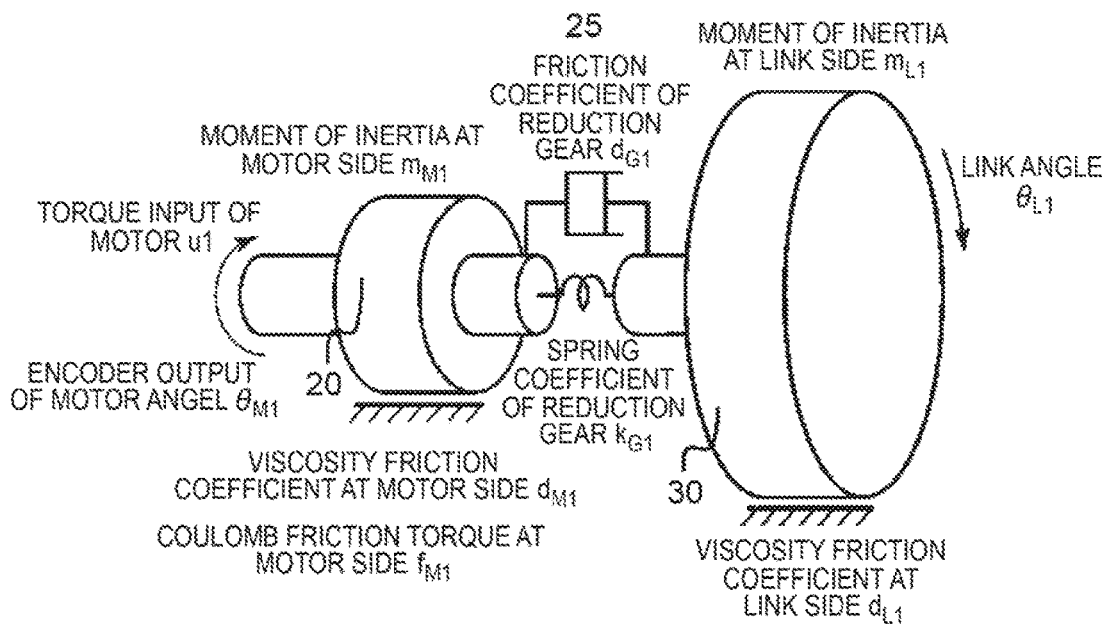
FIG. 2 is a schematic diagram of 1-link of a robot arm.

FIG. 2 is a schematic diagram of 1-link of a robot arm. This is called two-inertia system. This robot arm is represented by a nonlinear dynamics model as a serial 2-link arm having elastic joints. In FIG. 2, regarding a physical parameter, a moment of inertia, a friction coefficient and a spring coefficient (necessary to derivate 1-link nonlinear dynamics model), the first axis is shown on behalf of them. As shown in FIG. 2, the link 30 is driven-controlled by the motor 20 via the reduction gear 25. As to the first axis, a torque input of the motor 20 is $u_1$, a moment of inertia of the motor 20 is $m_{M1}$, a rotation angle of the motor 20 (i.e., output detected by the encoder) is $\theta_{M1}$, a viscosity friction coefficient of the motor 20 is $d_{M1}$, a Coulomb friction coefficient of the motor 20 is $f_{M1}$, a damping coefficient of the reduction gear 25 is $d_{G1}$, a spring coefficient of the reduction gear 25 is $k_{G1}$, a moment of inertia of the link 30 is $m_{L1}$, a viscosity friction coefficient of the link 30 is dr, and a rotation angle of the link 30 is $\theta_{L1}$.

As to the second axis (not shown in Fig.), a torque input of the motor 20 is $u_2$, a moment of inertia of the motor 20 is $m_{M2}$, a rotation angle of the motor 20 (i.e., output detected by the encoder) is $\theta_{M2}$, a viscosity friction coefficient of the motor 20 is $d_{M2}$, a Coulomb friction coefficient of the motor 20 is $f_{M2}$, a damping coefficient of the reduction gear 25 is $d_{G2}$, a spring coefficient of the reduction gear 25 is $k_{G2}$, a moment of inertia of the link 30 is $m_{L2}$, a viscosity friction coefficient of the link 30 is $d_{L2}$, and a rotation angle of the link 30 is $\theta_{L2}$.

As a result, in 2-link arm nonlinear dynamics model, as two-dimensional vector, a torque input of the motor 20 is u, a moment of inertia of the motor 20 is $m_M$, a rotation angle of the motor 20 (i.e., output detected by the encoder) is $\theta_M$, a viscosity friction coefficient of the motor 20 is $d_M$, a Coulomb friction coefficient of the motor 20 is $f_M$, a damping coefficient of the reduction gear 25 is $d_G$, a spring coefficient of the reduction gear 25 is $k_G$, a moment of inertia of the link 30 is $m_L$, a viscosity friction coefficient of the link 30 is $d_L$, and a rotation angle of the link 30 is $\theta_L$.

In the serial 2-link arm nonlinear dynamics model having elastic joints, the motor side is represented as an equation (1), and the link side is represented as an equation (2).

$$M_M \ddot{\theta}_M + D_M \dot{\theta}_M + f_M \mathrm{sgn}(\dot{\theta}_M) = \\ Eu - N_G [K_G(N_G \theta_M - \theta_L) + D_G(N_G \dot{\theta}_M - \dot{\theta}_L)] \quad (1)$$

$$M_L(\theta_L)\ddot{\theta}_L + c_L(\dot{\theta}_L, \theta_L) + D_L \dot{\theta}_L = \\ K_G(N_G \theta_M - \theta_L) + D_G(N_G \dot{\theta}_M - \dot{\theta}_L) \quad (2)$$

$\theta_M = [\theta_{M1}, \theta_{M2}]^T$: rotation angle of motor (1, 2: axis number)
$\theta_L = [\theta_{L1}, \theta_{L2}]^T$: rotation angle of link
$a = [a_1, a_2]^T$: translational acceleration of link
$M_L(\theta_L) \in R^{2 \times 2}$: inertia matrix of link
$c_L(\dot{\theta}_L, \theta_L) \in R^{2 \times 1}$: centrifugal force Coriolis force vector
$M_M = \mathrm{diag}(m_{M1}, m_{M2})$: motor—side inertial of reduction gear
$D_M = \mathrm{diag}(d_{M1}, d_{M2})$: viscosity friction coefficient of motor axis
$D_L = \mathrm{diag}(d_{L1}, d_{L2})$: viscosity friction coefficient of link axis
$K_G = \mathrm{diag}(k_{G1}, k_{G2})$: spring coefficient of reduction gear
$D_G = \mathrm{diag}(d_{G1}, d_{G2})$: damping coefficient of reduction gear
$N_G = \mathrm{diag}(n_{G1}, n_{G2})$: reduction ratio ($n_{G1}, n_{G2} \leq 1$)
$f_M = [f_{M1}, f_{M2}]^T$: Coulomb friction coefficient of motor axis
$E = \mathrm{diag}(e_1, e_2)$: torque/voltage(current reference value) constant
$u = [u_1, u_2]^T$: input voltage(reference value to motor current controller)

Here, assume that parameters composed by a length, a center of mass, a mass, and a moment of inertia of the link, are $\alpha, \beta, \gamma$. An inertia matrix of the link is represented as an equation (3).

$$M_L(\theta_L) = \begin{bmatrix} \alpha + \beta + 2\gamma\cos(\theta_{L2}) & \beta + \gamma\cos(\theta_{L2}) \\ \beta + \gamma\cos(\theta_{L2}) & \beta \end{bmatrix} \quad (3)$$

Furthermore, detail of parameters $\alpha, \beta, \gamma$ are represented as an equation (4).

$$\alpha = m_1 l_{g1}^2 + I_{z1} + m_2 l_1^2$$

$$\beta = m_2 l_{g2}^2 + I_{z2}$$

$$\gamma = m_2 l_1 l_{g2} \quad (4)$$

$l_i$: length of each link (i:axis number)
$m_i$: mass of each link
$l_{gi}$: center of mass of each link (link is bilateral symmetry along longitudinal direction)
$I_{zi}$: moment of inertia around the center of mass of each link Centrifugal force and Coriolis force vector are represented as an equation (5).

$$c_L(\dot{\theta}_L, \theta_L) = \begin{bmatrix} -\gamma(2\dot{\theta}_{L1}\dot{\theta}_{L2} + \dot{\theta}_{L2}^2)\sin(\theta_{L2}) \\ \gamma \dot{\theta}_{L1}^2 \sin(\theta_{L2}) \end{bmatrix} \quad (5)$$

As to the motor angular velocity controller, PI (proportion, integration) control is regarded as FF-I-P (feedforward-integration-proportion) control, and represented as an equation (6) of two-degree-of-freedom PI velocity controller.

$$u_i = k_{FVi} \dot{\theta}_{MRi} + kIVi \int (\dot{\theta}_{MRi} - \dot{\theta}_{Mi}) dt - k_{PVi} \dot{\theta}_{Mi} (i=1,2) \quad (6)$$

$\dot{\theta}_{MR_i}$: target value of motor angular velocity (i:axis number)

$\dot{\theta}_{M_i}$: motor angular velocity $k_{FV_i}$: feedforwad control gain of target value of motor angular velocity $k_{IV_i}$: feedforward control gain of error integration of motor angular velocity $k_{PV_i}$: feedforward control gain of proportion of motor angular velocity $u_i$: input voltage(reference value to motor current controller)

Figure 3:
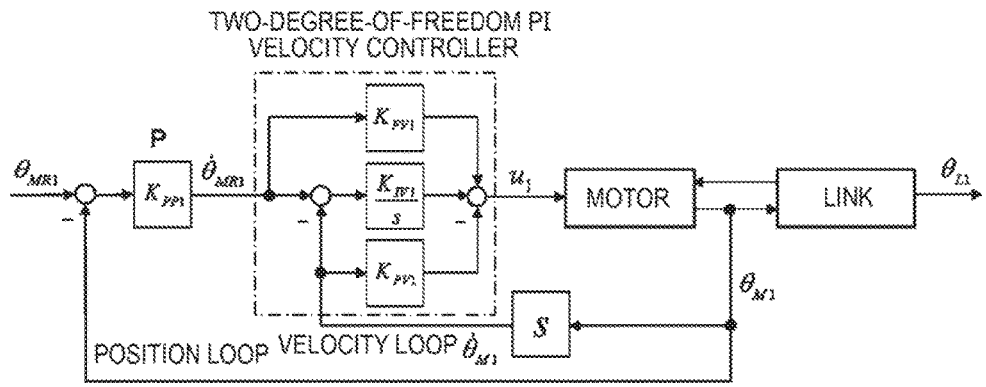
FIG. 3 is a block diagram showing a position of each axis of the robot arm and a velocity controller thereof.

FIG. 3 is a block diagram showing a position of each axis of the robot arm and a velocity controller thereof. As shown in FIG. 3, two-degree-of-freedom PI velocity controller is composed as a controller cascade-connected inside a position controller (P control). Moreover, in FIG. 3, two-degree-of-freedom PI velocity controller related to the first axis is shown.

Hereinafter, an angular velocity controller of motor excluding the position controller is focused. Assume that the control period is sufficiently short. As a result, the angular velocity controller of motor will be explained as a continuous system.

First, physical parameters of the equation (1) are identified by conventional method. Next, the identified physical parameters are substituted for the equation (1) and the equation (6) representing velocity feedback control rule. As a result, a simulation model of velocity controller of 2-link robot arm is built.

In the first embodiment, by using this simulation model, an observer part (called "computation part" or "derivation part") to estimate torsion acceleration of a tip of the robot arm.

Figure 4:
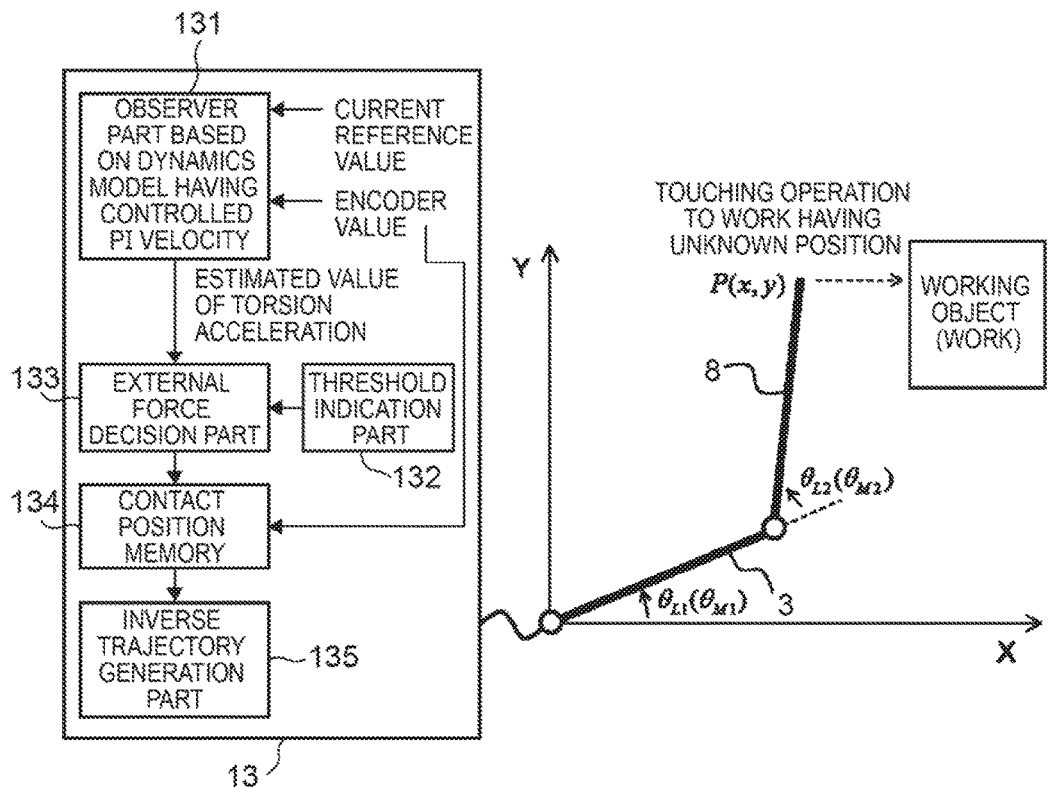
FIG. 4 is a block diagram of the robot control device using torsion acceleration.

FIG. 4 is a block diagram of the robot control device 13. The robot control device 13 includes an observer part 13 (based on dynamics model having controlled PI velocity), a threshold indication part 132, an external force decision part 133, a contact position memory 134, and an inverse trajectory generation part 135.

The observer part 131 accepts torque inputs (current reference value) of the first motor 4 and the second motor 9, and encoder values from the first encoder 6 and the second encoder 11. By using 2-link arm nonlinear dynamics model, the observer part 131 calculates an estimated value of torsion acceleration.

In the threshold indication part 132, a threshold (previously indicated by a worker (user)) of external force added to the tip of arm is indicated. The threshold indication part 132 (called as "indication part") equips an input device (not shown in Fig.), and the worker may indicate using the input device. Furthermore, a predetermined value may be set by considering a rigidity of the arm. As the input device, a computer or a portable terminal may be used. Here, the external force is acceleration occurred at the link from the outside. The external force includes a velocity and an external disturbance torque except for the acceleration.

The external force decision part 133 (called as "decision part") compares the threshold (indicated by the threshold indication part 132) with a torsion acceleration of the tip of arm (derived by the observer part 131). If the torsion acceleration is larger than (or equal to) the threshold, the observer part 131 decides that the external force from the outside exists. If the torsion acceleration is smaller than the threshold, the observer part 131 decides that the external force from the outside does not exist. As the decision, if the torsion acceleration is larger than the threshold, the observer part 131 may decide that the external force from the outside exists. If the torsion acceleration is smaller than (or equal to) the threshold, the observer part 131 may decide that the external force from the outside does not exist. The external force from the outside is an external force occurred at the payload 12 of the second link 8 (tip of the robot ara) by touching operation.

The contact position memory 134 (called "storage") stores an encoder value of motor of each axis when the torsion acceleration is larger than (or equal to) the threshold (as the comparison result by the external force decision part 133). The encoder value is values such as a rotation angle of motor, the number of rotation, a velocity of motor, a load of motor, and so on. For example, as the contact position memory 134, a tape system such as a magnetic tape or a cassette tape, a disk system such as a magnetic disk (floppy disk (registered trade mark)/hard disk) or an optical disk (CD-RON/MD/ND/DVD/CD-R), a card system such as an IC card (including a memory card) or an optical card, and a semiconductor memory system such as a mask RON/EPROM/EEPROM/flash RON, can be used.

The inverse trajectory generation part 135 (called as "generation part") generates a trajectory to move the arm along a direction opposite to the working object, in order to suppress impact due to external force occurred by the touching operation. By this operation, the arm is stopped at a distance from a surface of the working object.

Calculation by the observer part 131, the external decision part 133 and the inverse trajectory generation part 135 is performed by a CPU (Central Processing Unit) of the computer.

Next, the observer part of the first embodiment will be explained in detail.

Figure 5:
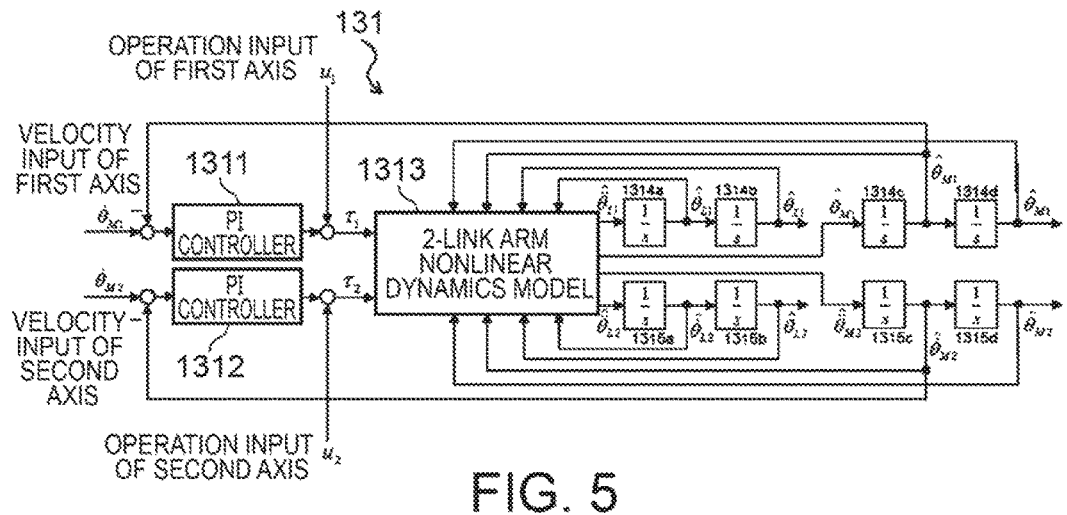
FIG. 5 is a block diagram of an observer part of the robot control device according to the first embodiment.

FIG. 5 is a block diagram of the observer part according to the first embodiment. As shown in FIG. 5, the observer part 131 equips a PI controller 1311 of the first axis, a PI controller 1312 of the second axis, 2-link arm nonlinear dynamics model 1313, integrators 1314a~1314d and 1315a~1315d to integrate the nonlinear dynamics model 1313.

The PI controller 1311 performs PI control based on an error between a velocity $d\theta_{M1}/dt$ of a motor to drive the first axis and an estimated value of a rotation velocity of the motor to drive the first axis. The PI controller 1312 performs PI control based on an error between a velocity $d\theta_{M2}/dt$ of a motor to drive the second axis and an estimated value of a rotation velocity of the motor to drive the second axis. Based on a first input $\tau_1$ (sum of output of the PI controller 1311 and an operation amount $u_1$ of the first axis) and a second input $\tau_2$ (sum of output of the PI controller 1312 and an operation amount $u_2$ of the second axis), the 2-link arm nonlinear dynamics model 1313 estimates angular accelerations of the first link and the second link, estimates angular accelerations of two motors respectively driving the first link and the second link, and outputs respective estimated values of angular accelerations. The integrator 1314a integrates the estimated value (outputted from the nonlinear dynamics model 1313) of angular acceleration of the first link, and outputs an estimated value of an angular velocity. The integrator 1314b integrates the output value from the integrator 1314a, and outputs an estimated value of a rotation angle of the first link. The integrator 1314c integrates the estimated value (outputted from the nonlinear dynamics model 1313) of angular acceleration of a motor driving the first link, and outputs an estimated value of an angular velocity of the motor. The integrator 1314d integrates the output value from the integrator 1314*c*, and outputs an estimated value of a rotation angle of the motor driving the first link.

The integrator 1315*a* integrates the estimated value (outputted from the nonlinear dynamics model 1313) of angular acceleration of the second link, and outputs an estimated value of an angular velocity. The integrator 1315*b* integrates the output value from the integrator 1315*a*, and outputs an estimated value of a rotation angle of the second link. The integrator 1315*c* integrates the estimated value (outputted from the nonlinear dynamics model 1313) of angular acceleration of a motor driving the second link, and outputs an estimated value of an angular velocity of the motor. The integrator 1315*d* integrates the output value from the integrator 1315*c*, and outputs an estimated value of a rotation angle of the motor driving the second link.

The estimated values of the angular acceleration of the first link and the second link, the estimated value of the angular velocity of the first link and the second link, the estimated values of the angular velocity of the motor driving the first link and the second link, and the estimated values of the rotation angle of the motor, are respectively outputted from the observer part 1312.

Namely, the nonlinear dynamics model 1313 of robot arm is built in the observer part 131 shown in FIG. 5. As observer gains of the PI controllers 1311 and 1312, PI control gains of an existing velocity controller for each axis of the robot arm are used as it is in the simulation model. Namely, there is no engineering cost to regularly adjust the observer gains. This is accomplished by accurately identifying the physical parameters.

PI control type observer based on nonlinear dynamics model is represented as second order differential form such as an equation (7) transformed from the equation (1). In the equation (7), represents an estimated value.

$$\hat{\ddot{\theta}}_M = M_M^{-1} \{ \ldots D_M \hat{\dot{\theta}}_M \ldots f_M sgn(\hat{\dot{\theta}}_M) + E_\tau - N_G[K_G(N_G \hat{\theta}_M - \hat{\theta}_L) + D_G(N_G \hat{\dot{\theta}}_M - \hat{\dot{\theta}}_L)] \}$$

$$\hat{\ddot{\theta}}_L = M_L(\hat{\theta}_L)^{-1}[-c_L(\hat{\theta}_L, \hat{\dot{\theta}}_L) - D_L \hat{\dot{\theta}}_L + K_G(N_G \hat{\theta}_M - \hat{\theta}_L) + D_G(N_G \hat{\dot{\theta}}_M - \hat{\dot{\theta}}_L)]$$

$$\tau = K_{PV}(\dot{\theta}_M - \hat{\dot{\theta}}_M) + K_{IV} \int (\dot{\theta}_M - \hat{\dot{\theta}}_M) dt + u \quad (7)$$

$\dot{\theta}_M = [\dot{\theta}_{M1}, \dot{\theta}_{M2}]^T$: input of angular velocity of motor to observer $u = [u_1, u_2]^T$: input to observer (current reference value of motor)

$K_{PV} = \text{diag}(k_{PV1}, k_{PV2})$: velocity error proportion control gain $K_{IV} = \text{diag}(k_{IV1}, k_{IV2})$: velocity error integration control gain $\tau = [\tau_1, \tau_2]^T$: input inside observer (current reference value of motor)

In this way, the angular velocity of the motor (enooder-differenoe) and an input voltage (current reference value) to a motor driver are inputted to the observer part 131. Here, observer gains of the PI controllers 1311 and 1312 are selected as the same ones as PI gains of FF-I-P control (two-degree-of-freedom PI control) for velocity loop of actual machine. In this case, only one-degree-of-freedom of following performance of observer had better be thought about. Accordingly, the observer gains are set as PI control such as "FF=P". This system is one type of nonlinear observer having constant gains.

As a result, from a difference between the estimated value of angular acceleration of each link and the estimated value of angular acceleration of the motor, an estimated value of torsion angular acceleration is represented as an equation (8).

$$\Delta \hat{\ddot{\theta}}_i = \hat{\ddot{\theta}}_{Li} - n_{Gi} \hat{\ddot{\theta}}_{Mi} (i=1,2) \quad (8)$$

Here, assume that a length of each link of the robot arm is $l_1$ and $l_2$, and that a coordinate of the tip of arm is P(x,y). This coordinate is calculated as an equation (9).

$$x = l_1 \cos(\theta_{L1}) + l_2 \cos(\theta_{L1} + \theta_{L2})$$

$$y = l_1 \sin(\theta_{L1}) + l_2 \sin(\theta_{L1} + \theta_{L2}) \quad (9)$$

By differentiating both sides of the equation (9), an equation (10) is acquired by using Jacobian matrix J(O8).

$$\begin{bmatrix} \dot{x} \\ \dot{y} \end{bmatrix} = J(\theta_L) \begin{bmatrix} \dot{\theta}_{L1} \\ \dot{\theta}_{L2} \end{bmatrix} \quad (10)$$

By using the equation (10), as a relationship between a torsion angular velocity and a torsion velocity of the tip of arm, an equation (11) is acquired.

$$\begin{bmatrix} \Delta \dot{x} \\ \Delta \dot{y} \end{bmatrix} = J(\theta_L) \begin{bmatrix} \Delta \dot{\theta}_1 \\ \Delta \dot{\theta}_2 \end{bmatrix} \quad (11)$$

Furthermore, by differentiating both sides of the equation (11), as a relationship between a torsion angular acceleration and a torsion acceleration of the tip of arm, an equation (12) is acquired.

$$\begin{bmatrix} \Delta \ddot{x} \\ \Delta \ddot{y} \end{bmatrix} = J(\theta_L) \begin{bmatrix} \Delta \ddot{\theta}_1 \\ \Delta \ddot{\theta}_2 \end{bmatrix} \quad (12)$$

However, assume that a moving velocity of the arm (supposed in the first embodiment) is small, and that $dJ(\theta_L)/dt$ appeared in differential process is negligibly small. Moreover, the torsion angle is minute. Accordingly, by defining $J(\theta_L)$ as "$J(\theta_L) = J(n_G \theta_M)$", the torsion angle can be derived tram a measurable velocity of the motor.

Figure 6:
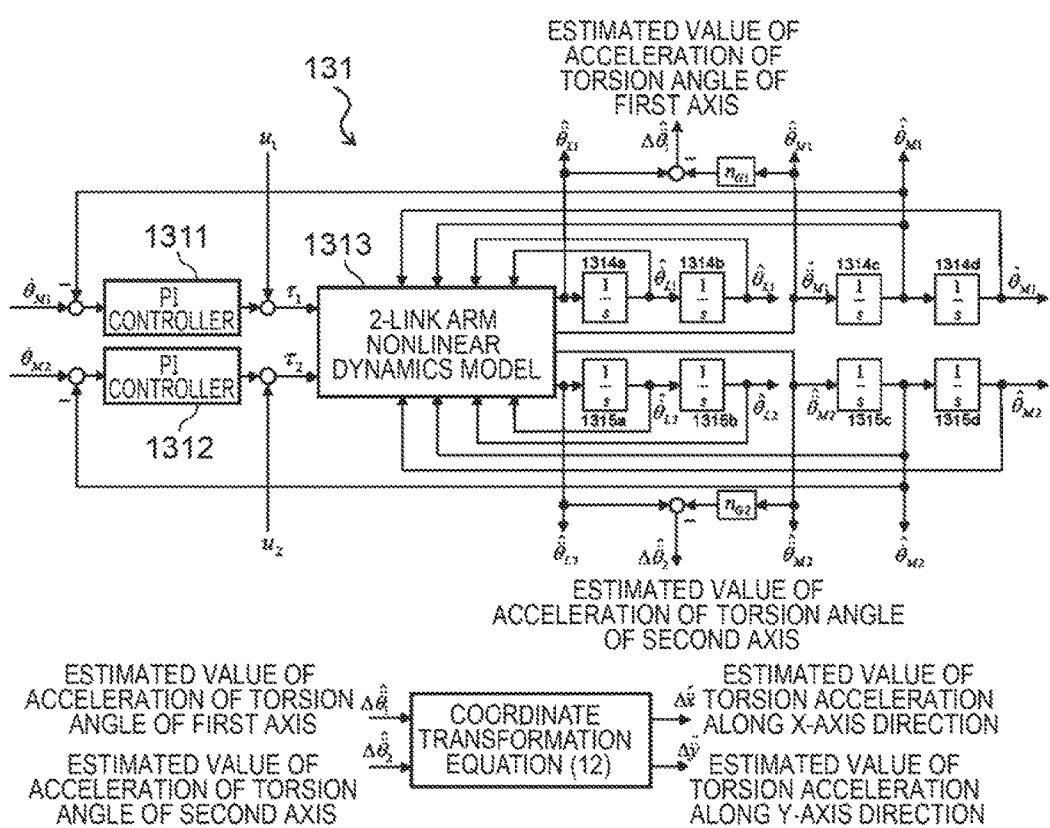
FIG. 6 is a block diagram of the observer part to estimate torsion acceleration of a tip of arm based on the observer part shown in FIG. 5.

FIG. 6 is a block diagram of the observer part to estimate the torsion acceleration of the tip of arm based on the observer part shown in FIG. 5. By using the observer part of FIG. 6, the torsion angular acceleration is derived. By using the equation (12) for coordinate-transformation, the torsion acceleration of the tip of arm can be calculated.

In detail, as shown in FIG. 6, based on the estimated value of angular acceleration of the first link 3, the reduction ratio $n_{G1}$ of the first reduction gear 5 located between the first link 3 and the first motor 4 (driving the first link 3), and the estimated value of angular acceleration of the first motor 4, an estimated value of torsion angular acceleration of the first axis is calculated and outputted (based on the equation (8)). In the same way, based on the estimated value of angular acceleration of the second link 8, the reduction ratio $n_{G2}$ of the second reduction gear 10 located between the second link 8 and the second motor 9 (driving the second link 8), and the estimated value of angular acceleration of the second motor 9, an estimated value of torsion angular acceleration of the second axis is calculated and outputted (based on equation (8)). By performing coordinate-transformation to respective estimated values of torsion angular acceleration of the first axis and the second axis with the equation (12), a torsion acceleration of the tip of arm is calculated.

Furthermore, by using values of the first encoder 6 and the second encoder 11 when the external force decision part 133 decides that the external force exists, and a length of each link(stored in the contact position memory 134), a coordinate P(x,y) of the working object is derived from the equation (9). The coordinate P(x,y) may be derived by the inverse trajectory generation part 135 or the observer part 131.

Next, the estimated value of torsion acceleration of arm in the case of using the robot control device of the first embodiment is compared with a contact force of the tip of arm measured by the force sensor.

FIGS. 7A and 7B are graphs showing time response waveforms in the case of touching operation. FIG. 7A shows a waveform of a contact force (due to the touching operation) measured by the force sensor attached at the tip of arm. FIG. 7B shows a waveform of torsion acceleration of the tip of arm (while the touching operation is being performed) estimated by the robot control device of the first embodiment.

By comparing FIG. 7A with FIG. 7B, the estimated torsion acceleration of the tip of arm represents a moment of touching (contact) by the tip of arm with high accuracy.

By using the robot control device of the first embodiment, even if the force sensor (and so on) is not specially installed, the external force added to the arm can be estimated with high accuracy.

Furthermore, by using the robot control device of the first embodiment, the force sensor (and so on) need not be specially installed. As a result, cost-reduction and space-saving are carried out.

The Second Embodiment

The second embodiment will be explained by referring to FIG. 8. FIG. 8 shows one example of the observer part of the robot control device according to the second embodiment.

In the observer part of the second embodiment, instead of the estimated value of torsion acceleration, an estimated value of torsion velocity is outputted, which is different from the robot control device of the first embodiment. Other components are same as those of the robot control device of the first embodiment.

As shown in FIG. 8, an estimated value of torsion angular velocity to derive the estimated value of torsion velocity is calculated from a difference between the estimated value of angular velocity of each link and the estimated value of angular velocity of each motor.

In detail, in this observer 131, based on the estimated value of angular velocity of the first link 3, the reduction ratio $n_{G1}$ of the first reduction gear 5 located between the first link 3 and the first motor 4 (driving the first link 3), and the estimated value of angular velocity of the first motor 4, an estimated value of torsion angular velocity of the first axis is calculated and outputted. In the same way, based on the estimated value of angular velocity of the second link 8, the reduction ratio $n_{G2}$ of the second reduction gear 10 located between the second link 8 and the second motor 9 (driving the second link 8), and the estimated value of angular velocity of the second motor 9, an estimated value of torsion angular velocity of the second axis is calculated and outputted. By performing coordinate-transformation to respective estimated values of torsion angular velocity of the first axis and the second axis with the equation (11), the estimated value of torsion velocity of the tip of arm is calculated.

Figure 9:
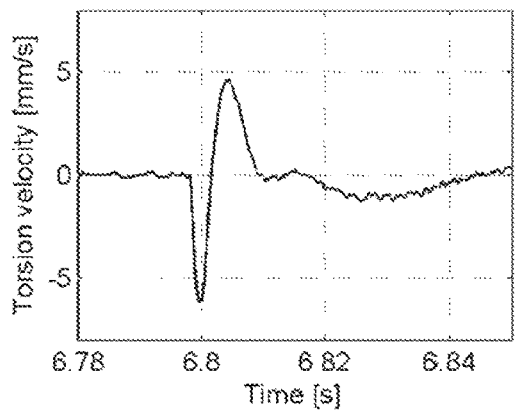
FIG. 9 is a graph showing estimated values of torsion velocity of the tip of arm estimated by the robot control device according to the second embodiment.

FIG. 9 shows a waveform of estimated value of torsion velocity of the tip of arm estimated by the robot control device according to the second embodiment. In comparison with FIG. 9, the waveform (of the estimated value of torsion acceleration) shown in FIG. 7B has a higher similarity with the waveform (measured by the force sensor) shown in rig. 7A. However, the waveform of the torsion velocity shown in FIG. 9 has a higher stability than the waveform shown in FIG. 7B. Accordingly, the threshold is easy to be indicated for the torsion velocity. By combining the torsion acceleration and the torsion velocity, the external force can be decided with high accuracy.

The Third Embodiment

Figure 10:
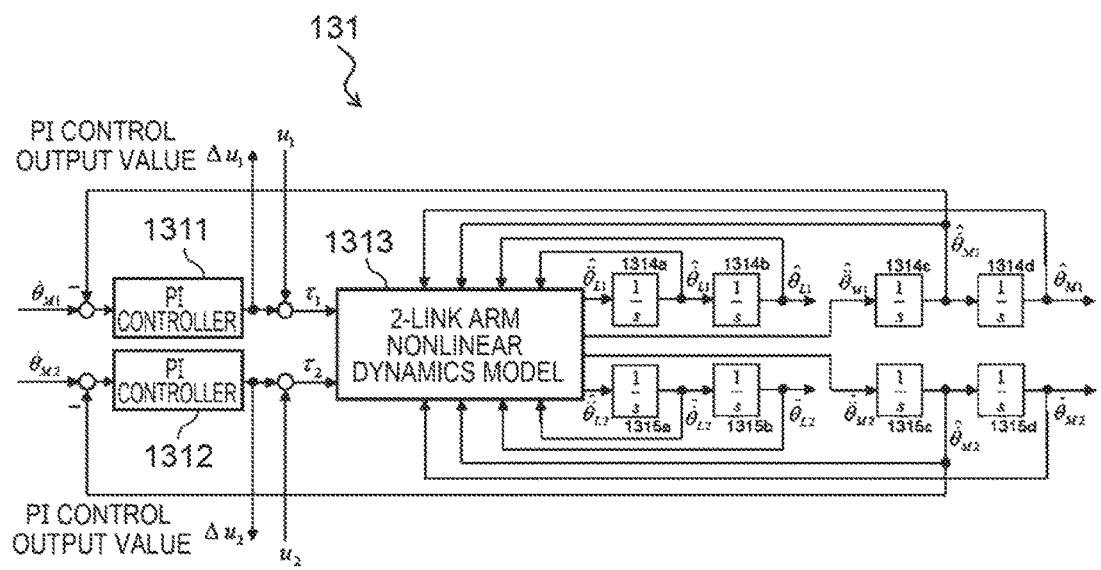
FIG. 10 is a block diagram of the observer part of the robot control device according to the third embodiment.

The third embodiment will be explained by referring to FIG. 10. FIG. 10 shows one example of the observer part of the robot control device according to the third embodiment.

In the observer part of the third embodiment, instead of the estimated value of torsion acceleration, a PI control output value is outputted, which is different from the robot control device of the first embodiment. Other components are same as those of the robot control device of the first embodiment.

As shown in FIG. 10, $\Delta u_1$ and $\Delta u_2$ respectively outputted from PI controllers 1311 and 1312 are used. The PI control output value includes an estimation error of the observer part and an external disturbance torque. Accordingly, by setting the threshold, only the external disturbance torque can be extracted.

Figure 11:
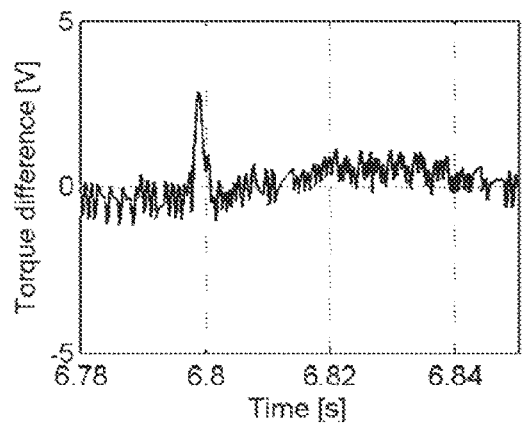
FIG. 11 is a graph showing PI control output value estimated by the robot control device according to the third embodiment.

FIG. 11 shows a waveform of the PI control output value estimated while the touching operation is being performed.

In FIG. 11, a peak position represents a contact point where the link contacts the working object. A noise level in the waveform shown in FIG. 11 is relatively large. Accordingly, the threshold is a little hard to be indicated. However, feedback by the observer part can be performed. As a result, in comparison with the case of using the nonlinear dynamics model as a closed loop, the threshold can be smaller value.

The Fourth Embodiment

The fourth embodiment will be explained by referring to FIGS. 12 and 13. FIGS. 12A and 12B are a side view and a front view showing one example of a picking device 100 including the robot control device 13 according to the first, second and third embodiments. FIG. 13 is a schematic diagram showing the picking device 100 facing a shelf where objects G are placed.

Here, in order to simplify explanation, +X-direction, −X-direction, +Y-direction, −Y-direction, +Z-direction, and −Z-direction will be defined. For example, +X-direction, −X-direction, +Y-direction, and −Y-direction, are directions approximately parallel to a horizontal plane. −X-direction is a direction opposite to +X-direction. In the fourth embodiment, −X-direction is a direction to pull the objects G near the picking device 100. As shown in FIG. 13, the direction to pull the objects G near the picking device 100 is a direction from the shelf 110 to the picking device 100. +Y-direction is a direction crossing +X-direction (For example, approximately-perpendicular direction). −Y-direction is a direction opposite to +Y-direction. +Z-direction is a direction crossing +X-direction and +Y-direction (For example, approximately-perpendicular direction), i.e., approximately-vertical upward direction. −Z-direction is a direction opposite to +Z-direction, for example, approximately-vertical downward direction.

As shown in FIG. 13, for example, the picking device 100 moves so as to face the shelf 110 located on a floor, and picks the objects G placed on the shelf 110. The shelf 110 includes a space at a side thereof so that the picking device 100 can recognize the objects G from lateral directions (+X-direction, −X-direction, +Y-direction, −Y-direction) and pick them. The objects G include a product put into a corrugated paper box, a packaged product, and a single item thereof.

Figures 12A, 12B:
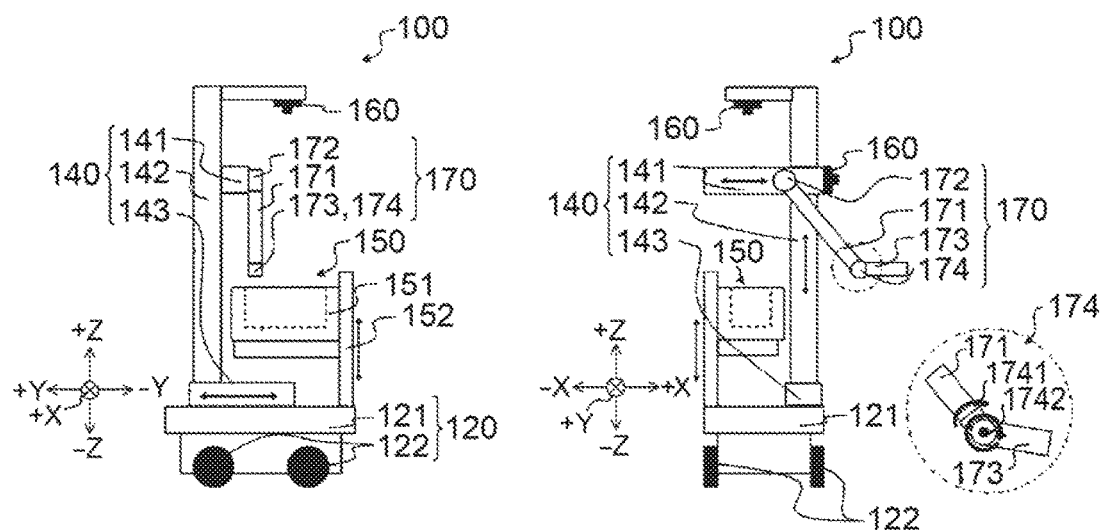
FIGS. 12A and 12B are a side view and a front view showing one example of a picking device including the robot control device according to the first, second and third embodiments.
Figure 13:
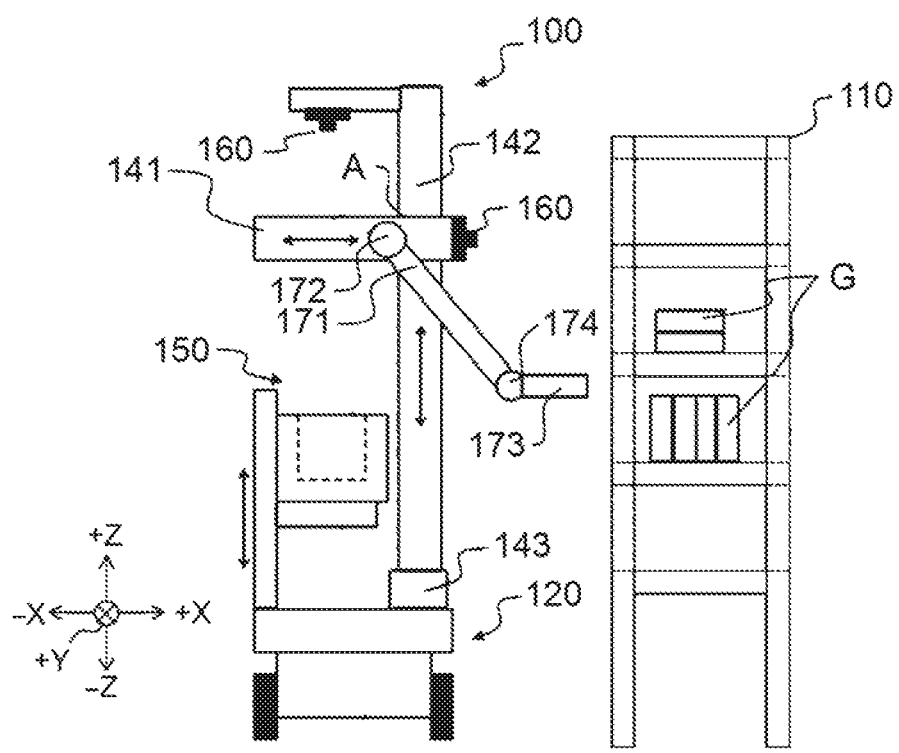
FIG. 13 is a schematic diagram showing the picking device facing a shelf where objects G are placed.

As shown in FIGS. 12A and 12B, the picking device 100 includes a carriage 120, a holding mechanism 170 to hold the objects G, a moving mechanism 140 to move the holding mechanism 170, and a cargo bed to put the object held by the holding mechanism 170.

The carriage 120 includes a base 121 on which the moving mechanism 140 and the cargo bed 150 are placed. For example, the base 121 equips four wheels 122. By rotation of the wheels 122, the carriage 120 moves on the floor where the shelf 110 is located. The means for moving is not limited to the wheels. It may be a caterpillar, or may move along a rail previously installed on a warehouse.

The carriage 120 is AGV (Automatic Guided Vehicle), and equips a controller to control driving of the wheels 122. The controller equips a position sensor (such as inertia sensor) and an image sensor, and measures a position of the carriage 120 on a traveling path by these sensors. The controller stores layout information of the shelf-position and the traveling path in a factory or the warehouse, and travels along a target path from the position of the carriage 120 (acquired by the layout information and the sensors). When layout of the shelf-position or the traveling path is changed, the layout information stored in the controller is updated. In above explanation, the carriage 120 detects the position thereof by the inertia sensor and so on (i.e., guideless method). However, a method for detect the position of the carriage 120 is not limited to the guideless method. For example, a guide method for detect the traveling path by an induction line or a magnetic tape set on a floor of the factory or the warehouse, may be used.

The holding mechanism 170 equips an arm 171, a rotation axis 172, a holding part 173, and a joint part 174. The rotation axis 172 is located at one end of the arm 171, and rotates the arm 171. The holding part 173 is located at the other end of the arm 171, and holds the objects G. The joint part 174 is located between the arm 171 and the holding part 173.

The arm 171 makes the holding part 173 be nearer to the objects G. For example, the arm 171 is formed by an aluminum alloy, a plastic material, and so on. Any material having high rigidity may be used as the arm 171. The arm 171 may have component of multi-joint.

The rotation axis 172 is composed by a motor, a reduction gear, a bearing, and an encoder. The motor, the reduction gear and the bearing are coaxially located. The encoder detects a rotation angle of the motor, the number of rotation, a velocity of the motor, a load of the motor, and so on.

The holding part 173 holds the objects G. The holding part 173 includes a plurality of suction pads (not shown in Fig.) connected to a vacuum pump (not shown in Fig.). By contacting the suction pads with the objects G, and by reducing a pressure between the objects G and the suction pads by the vacuum pump, the holding part 173 holds the objects G being sucked. A method for the holding part 133 to hold is not limited to the case of sucking by the suction pads. The method may be holding by clamping with a plurality of clamps. The vacuum pump may be installed into the carriage 120.

The joint part 174 includes a joint 1742 and a joint 1742. The joint 1741 rotates the holding part 173 around a torsional direction having axis as a longitudinal direction of the arm 171. The joint 1742 rotates the holding part 173 around an axis having direction perpendicular to the longitudinal direction of the arm 171. At the joint 1741 and the joint 1742, a servo motor is respeaotively installed, and drives the holding part along a predetermined direction. As mentionedabove, the joint part 174 includes two joints. However, the joint part 174 is not limited to this component. For example, ball-joint and so on may be used. In the robot control device of the first, second, and third embodiments, 2-link arm (two axes arm) is supposed. Accordingly, if the external force occurred at the arm or position information of the objects G is estimated using the robot control device of the first, second and third embodiments, the joint 1741 to rotate around the torsional direction is not driven.

Next, the moving mechanism 140 will be explained.

The moving mechanism 140 includes a first moving part 141, a second moving part 142 and a third moving part 143, which is a linear motion mechanism to move the holding mechanism 170 along three axes directions. Specifically, the rotation axis 172 of the holding mechanism 170 is installed to the first moving part 141. The first moving part 141 moves the rotation axis 172 along +X-direction or −X-direction. X-direction is a direction to make the holding mechanism 170 be nearer to the shelf or be farer from the shelf. The second moving part 142 is vertically installed to the base 121 of the carriage 120, and almost vertically connected to the first moving part 141. The second moving part 142 moves the first moving part 141 along +Z-direction or −Z-direction. Namely, the second moving part 142 moves the holding mechanism 170 along +Z-direction or −Z-direction. The third moving part 143 is horizontally installed onto an upper face of the base 121. The third moving part 143 is almost vertically connected to the second moving part 142. From another view point, the third moving part 143 is almost vertical to the first moving part 141. The third moving part 143 moves the second moving part 142 along +Y-direction or −Y-direction. Namely, the third moving part 143 moves the holding mechanism 170 along +Y-direction or −Y-direction. Y-direction is a direction in parallel to the shelf when the picking device 100 picks the objects G.

The first moving part 141, the second moving part 142 and the third moving part 143, are respectively located in parallel to three axes directions (moving directions), and move so as to slide along the respective directions.

For example, as the moving mechanism 140, a linear motion mechanism of an electric slider to which a stepping motor is installed may be used. Furthermore, instead of the electric slider, an electric cylinder may be used.

In the moving mechanism 140, a recognition part 160 is installed. The recognition part 160 recognizes a distance to the shelf 110, a distance to the object G (placed on the shelf 110), a shape and a placing status of the objects G. The recognition part 160 is located at a tip of the first moving part 141.

As the recognition part 160, a distance image sensor or a camera capable of measuring three-dimensional position (such as an infrared dot pattern projection camera) can be utilized. The infrared dot pattern projection camera projects an infrared dot pattern onto the target object, and images an infrared image of the objects G placed on the shelf 110 in this situation. By analyzing the infrared image, three-dimensional information of the objects G can be acquired.

The cargo bed 150 is a part to transfer the objects G held by the holding mechanism 170. The cargo bed 150 is located on the base of the carriage 120. The cargo bed 150 includes a transfer part 151 and a fourth moving part 152. The transfer part 151 is composed by a container, a box, a basket, a plate-like stage, and so on. The fourth moving part 152 is almost vertically located on the base 121 of the carriage 120, and can move the transfer part 151 along +Z-direction or −Z-direction. As the fourth moving part 152, for example, a linear motion mechanism of an electric slider to which a stepping motor is installed may be used. Furthermore, instead of the electric slider, an electric cylinder may be used. While the arm 171 is being driven, the cargo bed 150 moves along +Z-direction or −Z-direction so as not to contact the arm 171.

The robot control device 13 of the first, second and third embodiments is built in the controller of the carriage 120. The robot control device 13 acquires a current reference value and an encoder value (such as motor-angular velocity) of the motor located at the rotation axis 172 and the joint part 174 of the holding mechanism 170. Then, based on the current reference value and angular velocity information, the robot control device 13 estimates an external force occurred at the holding part 173. A method for the observer part 171 to estimate the external force, and a method for the threshold indication part 172 to indicate a threshold, are same as those of the robot control device of the first, second and third embodiments.

In the picking device 100 of the fourth embodiment, by touching the holding part 173 to the shelf 110 or the objects G placed thereon, position information of the shelf 110 and the objects G (unable to be correctly recognized by the recognition part 160) can be correctly acquired.

Furthermore, by combining the recognition part 160 with touching operation of the holding part 173 using the robot control device 13, holding of the objects G can be accurately performed.

Furthermore, by calibrating position information of the shelf 110 or the objects G with the robot control device 13, correct position information can be acquired without a plurality of the recognition parts 160.

Furthermore, the angular velocity and the velocity of the link (estimated by the robot control device of the first, second and third embodiments) are called as "a first estimated value". The angular velocity and the velocity of the motor are called as "a second estimated value".

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A robot control device used for a robot arm including a link and a motor for rotationally driving the link, the robot control device comprising:
a derivation part that derives a first estimated value including a variation of a rotation angle of the link and a second estimated value including a variation of a rotation angle of the motor, based on an angular velocity and a current reference value of the motor, and derives an external force generated to the robot arm, based on a difference between the first estimated value and the second estimated value.

2. The robot control device according to claim 1, further comprising:
an indication part that indicates a threshold; and
a decision part that decides existence or non-existence of the external force, based on the threshold and the external force,
wherein the decision part decides that the external force exists if the external force is larger than the threshold, and decides that the external force does not exist if the external force is smaller than the threshold.

3. The robot control device according to claim 2, further comprising:
a storage that stores the rotation angle of the motor when the decision part decides that the external force exists.

4. The robot control device according to claim 2, further comprising:
a generation part that generates an operation for the link to moderate the external force when the decision part decides that the external force exists.

5. The robot control device according to claim 4, wherein the generation part derives a position information of the link to which the external force is generated, based on a length of the link and the rotation angle of the motor stored in a storage.

6. The robot control device according to claim 1, wherein the derivation part performs coordinate-transformation to the difference.

7. The robot control device according to claim 1, wherein the first estimated value and the second estimated value are an angular acceleration of the link and an angular acceleration of the motor respectively, and the external force is an acceleration generated to the link from the outside.

8. The robot control device according to claim 1, wherein the first estimated value and the second estimated value are an angular velocity of the link and an angular velocity of the motor respectively, and the external force is a velocity generated to the link from the outside.

9. A robot control device used for a robot arm including a link and a motor for rotationally driving the link, the robot control device comprising:
a derivation part that derives PI control output values of the link and the motor, based on an angular velocity and a current reference value of the motor, and derives an external disturbance torque generated to the robot arm, based on the PI control output values.

10. A method for controlling a robot control device used for a robot arm including a link and a motor for rotationally driving the link, the method comprising:
deriving a first estimated value including a variation of a rotation angle of the link and a second estimated value including a variation of a rotation angle of the motor, based on an angular velocity and a current reference value of the motor; and
deriving an external force generated to the robot arm, based on a difference between the first estimated value and the second estimated value.

11. A picking device comprising:
the robot control device of claim 1; and
at least one of a holding mechanism and a moving mechanism.

* * * * *